United States Patent
Nagasaka et al.

(10) Patent No.: US 11,298,832 B2
(45) Date of Patent: Apr. 12, 2022

(54) MAIN MOLD AND CORE JOINING DEVICE AND MAIN MOLD AND CORE JOINING METHOD

(71) Applicant: SINTOKOGIO, LTD., Nagoya (JP)

(72) Inventors: Masahiko Nagasaka, Toyokawa (JP); Hiroyasu Makino, Toyokawa (JP); Takumi Kobayashi, Toyokawa (JP); Koji Ito, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 268 days.

(21) Appl. No.: 16/638,736

(22) PCT Filed: Jul. 13, 2018

(86) PCT No.: PCT/JP2018/026431
§ 371 (c)(1),
(2) Date: Feb. 12, 2020

(87) PCT Pub. No.: WO2019/092923
PCT Pub. Date: May 16, 2019

(65) Prior Publication Data
US 2021/0129346 A1    May 6, 2021

(30) Foreign Application Priority Data
Nov. 8, 2017  (JP) .............................. JP2017-215529

(51) Int. Cl.
*B25J 13/08*    (2006.01)
*B25J 9/16*    (2006.01)
*B22C 9/10*    (2006.01)

(52) U.S. Cl.
CPC ............. *B25J 13/085* (2013.01); *B22C 9/108* (2013.01); *B25J 9/1633* (2013.01); *B25J 9/1697* (2013.01)

(58) Field of Classification Search
CPC ...... B25J 13/085; B25J 9/1633; B25J 9/1697; B22C 9/108; B22C 23/00
(Continued)

(56) References Cited

U.S. PATENT DOCUMENTS 5,249,947 A * 10/1993 Inaba .................. B29C 45/1756
                                                       425/150
5,261,266 A * 11/1993 Lorenz .................. B25J 13/084
                                                       73/1.15
(Continued)

FOREIGN PATENT DOCUMENTS

CN          106272416 A      1/2017
JP          S54-091414 U     6/1979
(Continued)

OTHER PUBLICATIONS

Sep. 25, 2018 International Search Report issued in International Patent Application No. PCT/JP2018/026431.

Primary Examiner — Jaime Figueroa
(74) Attorney, Agent, or Firm — Oliff PLC

(57) ABSTRACT

[Problem] To provide a main mold and core setting device and a main mold and core setting method which enable core setting work, hitherto implemented by a core setting operator using subtle hand sensation, to be completely reproduced by automation.
[Solution] The present invention is provided with: a core grasping and moving means for grasping and moving a core; a core movement amount detection means for detecting a movement amount of the core grasping and moving means; a grasped core position and posture detection means for detecting a position, orientation, and inclination of the core grasped by the core grasping and moving means; a main mold position and posture detection means for detecting a position, orientation, and inclination of a main mold; a sensor for detecting a physical quantity applied to the core;
(Continued)

and a control means for constantly calculating relationships between relative positions, orientations, and inclinations of the main mold and the core, and from these relationships and the physical quantity applied to the core detected by the sensor, controlling the core grasping and moving means so that the core is caused to set with the main mold.

16 Claims, 8 Drawing Sheets

(58) Field of Classification Search
    USPC .................................................. 700/245–264
    See application file for complete search history.

(56) References Cited

U.S. PATENT DOCUMENTS

| | | | | |
|---|---|---|---|---|
| 5,371,931 | A * | 12/1994 | Kawana | B29C 37/00 29/33 K |
| 5,792,483 | A * | 8/1998 | Siegrist | B29C 45/5008 425/135 |
| 5,911,924 | A * | 6/1999 | Siegrist | B29C 45/7653 264/40.1 |
| 5,951,936 | A * | 9/1999 | Coxhead | B29C 37/0007 264/328.1 |
| 6,416,706 | B1 * | 7/2002 | Fisher | B29C 45/14008 264/275 |
| 7,206,665 | B2 * | 4/2007 | Groppe | B29C 70/32 700/245 |
| 9,511,550 | B2 * | 12/2016 | Mine | B29C 43/52 |
| 9,727,053 | B2 * | 8/2017 | Ito | G05B 19/42 |
| 10,363,637 | B2 * | 7/2019 | Oono | B25J 13/081 |
| 10,369,734 | B2 * | 8/2019 | Oono | B29C 45/7686 |
| 2004/0005372 | A1 * | 1/2004 | Shirahata | B25J 9/1676 425/135 |
| 2004/0084809 | A1 * | 5/2004 | Vanderploeg | B29C 45/006 264/334 |
| 2005/0209735 | A1 * | 9/2005 | Groppe | B29C 70/545 700/245 |
| 2008/0211126 | A1 * | 9/2008 | Kobayashi | B29C 45/7653 264/40.5 |
| 2009/0026644 | A1 * | 1/2009 | Masuda | B29C 45/76 264/40.1 |
| 2011/0233800 | A1 * | 9/2011 | Ogane | B29C 45/0055 264/2.5 |
| 2013/0054025 | A1 * | 2/2013 | Ito | B25J 9/1697 700/246 |
| 2013/0277005 | A1 * | 10/2013 | Sasaki | B22C 9/22 164/137 |
| 2015/0017390 | A1 * | 1/2015 | Mine | B29C 43/203 428/156 |
| 2017/0297243 | A1 * | 10/2017 | Oono | B29C 45/162 |
| 2018/0133786 | A1 * | 5/2018 | Amezawa | B22D 17/2236 |
| 2018/0290248 | A1 * | 10/2018 | Oono | B25J 13/08 |
| 2018/0290363 | A1 * | 10/2018 | Oono | B29C 45/42 |

FOREIGN PATENT DOCUMENTS

| | | |
|---|---|---|
| JP | H04-220139 A | 8/1992 |
| JP | H05-212496 A | 8/1993 |
| JP | H06277799 A | 10/1994 |
| JP | H10-085898 A | 4/1998 |
| JP | 3223033 B2 | 10/2001 |
| JP | 2008-023590 A | 2/2008 |

* cited by examiner

[Fig. 1]
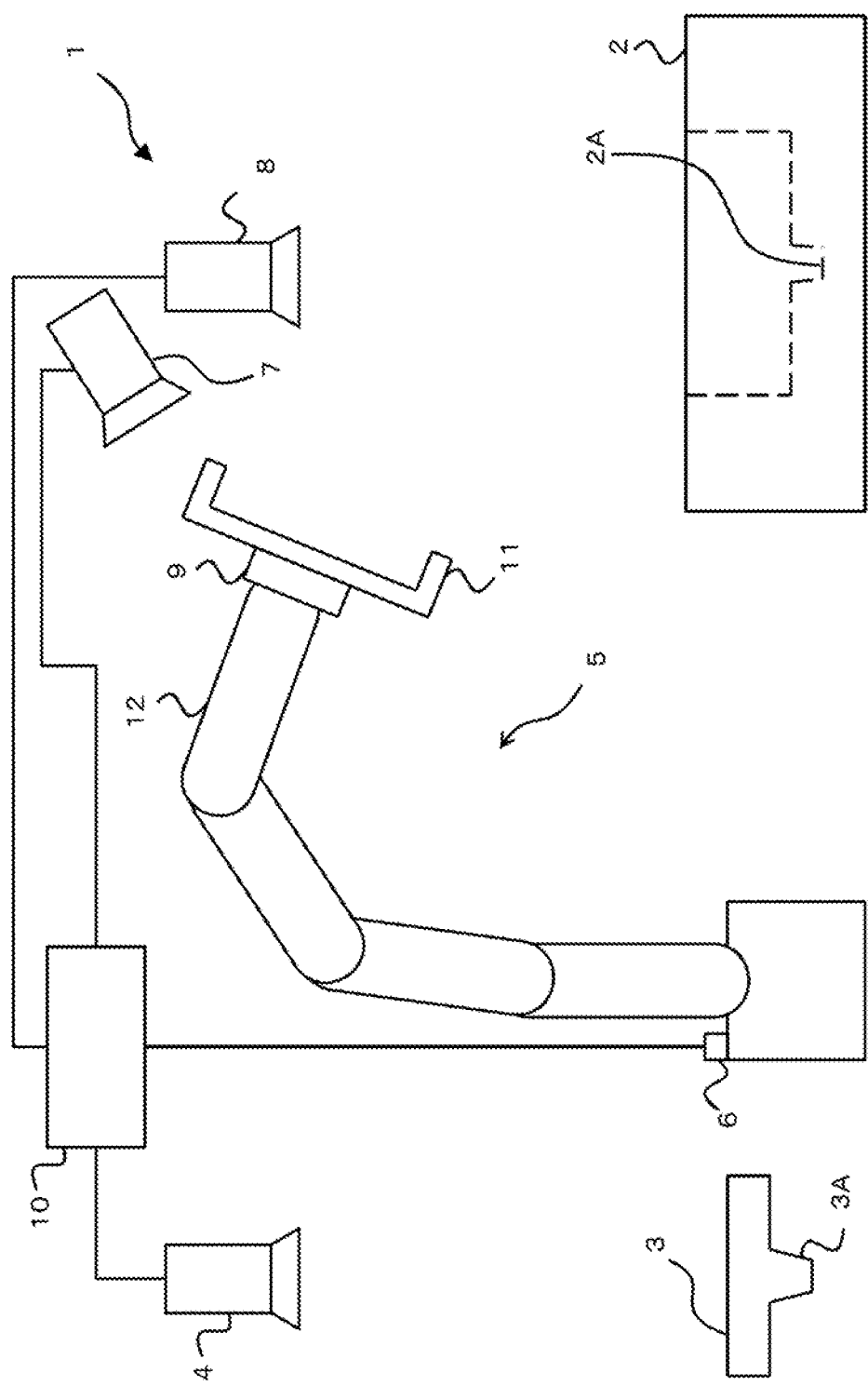

[Fig. 2]
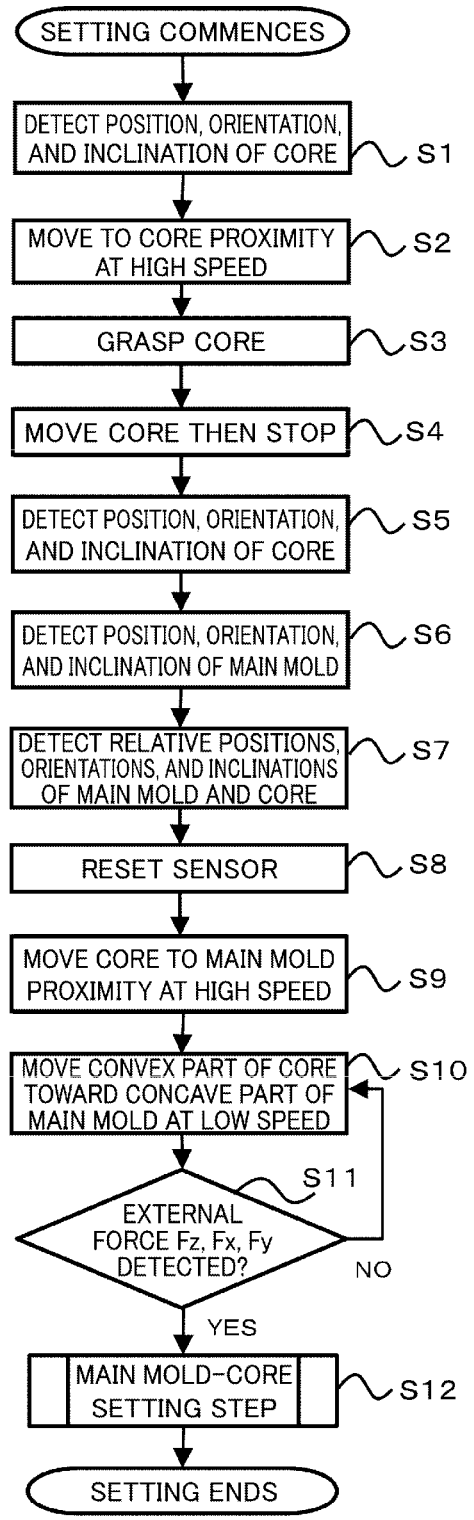

[Fig. 3]
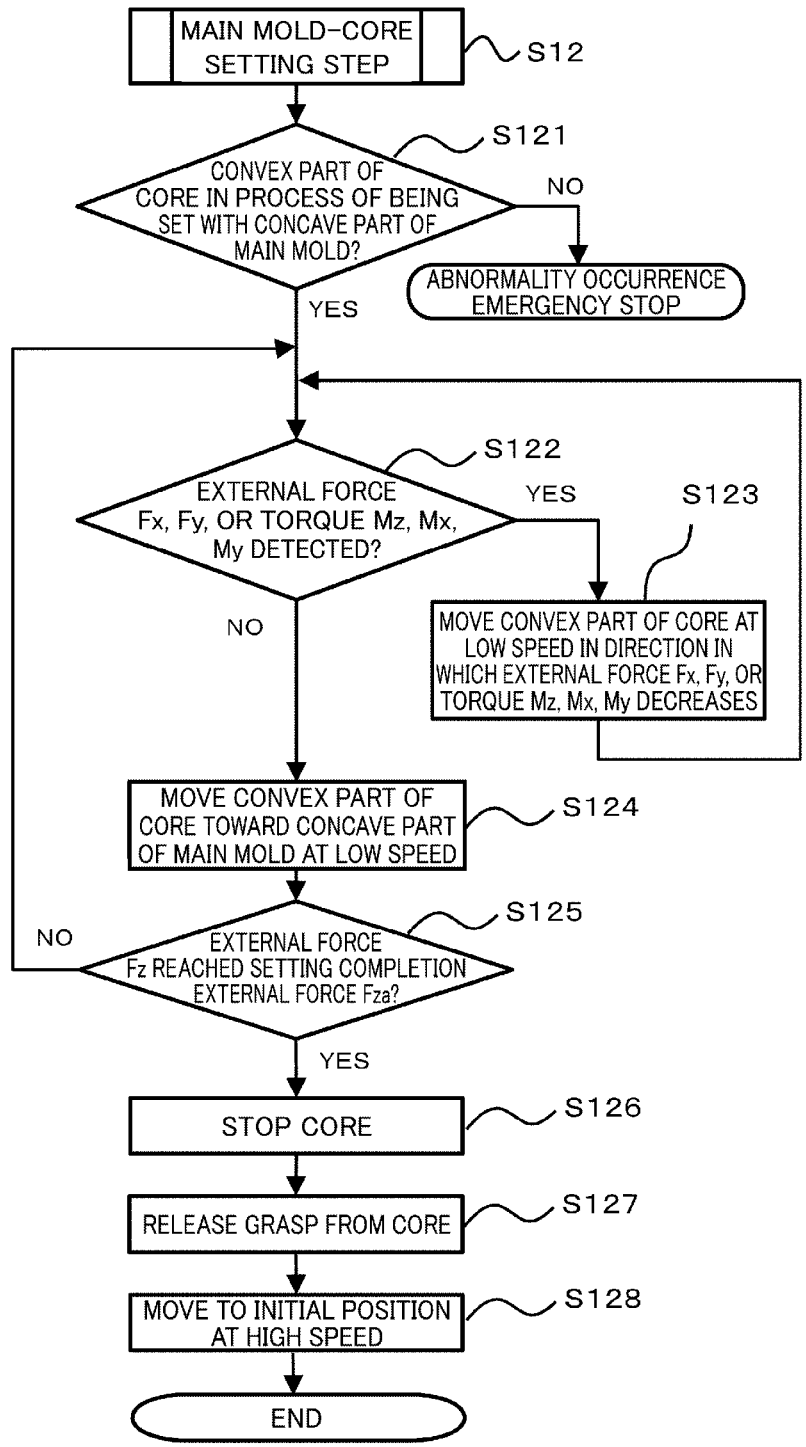

[Fig. 4]
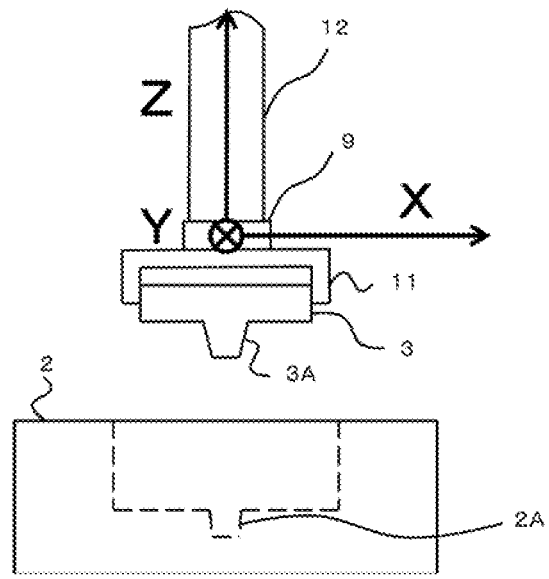
[Fig. 5]
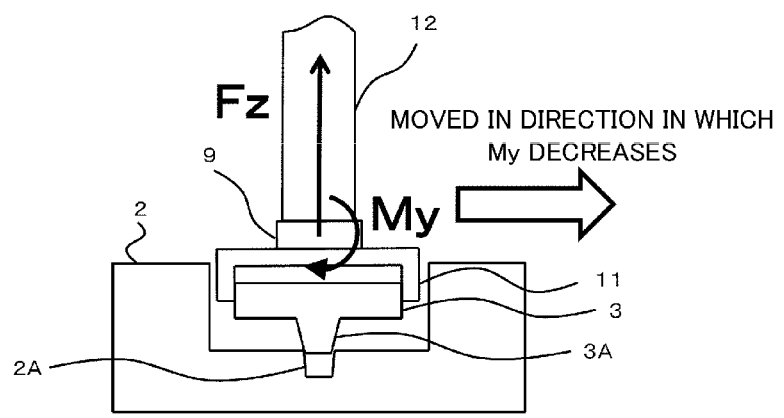

[Fig. 6]
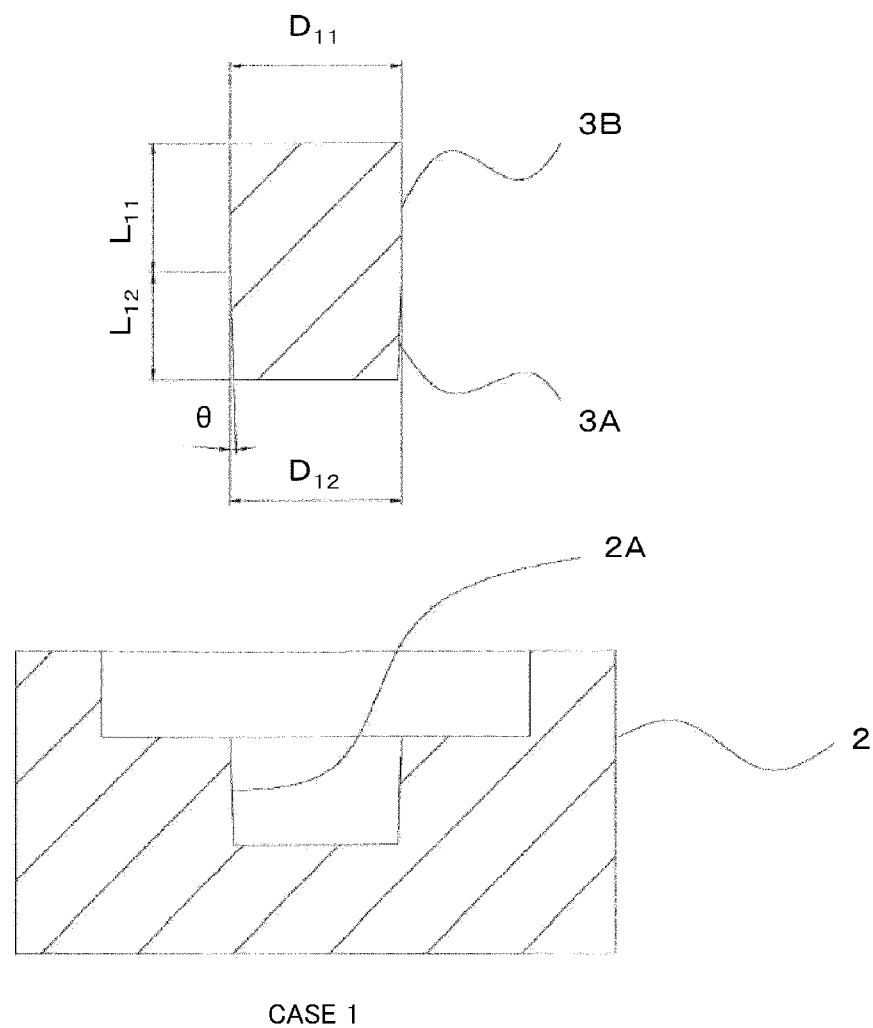
CASE 1

[Fig. 7]
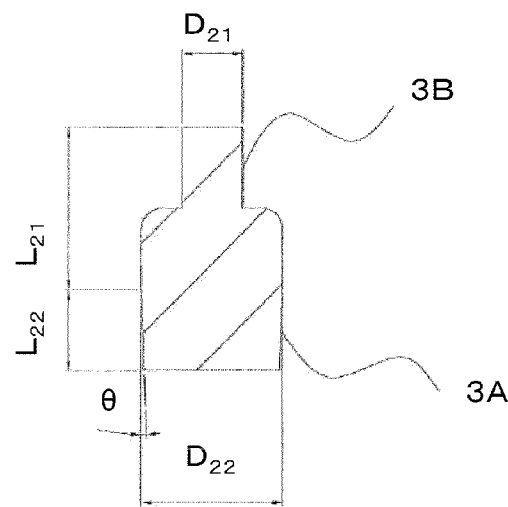
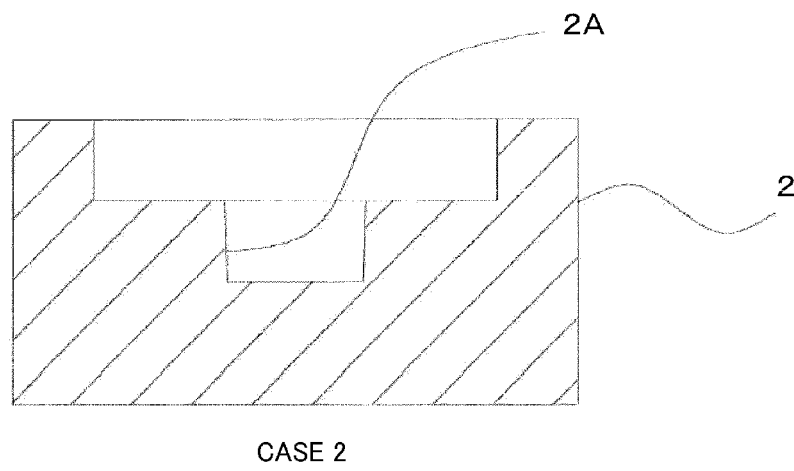
CASE 2

[Fig. 8]
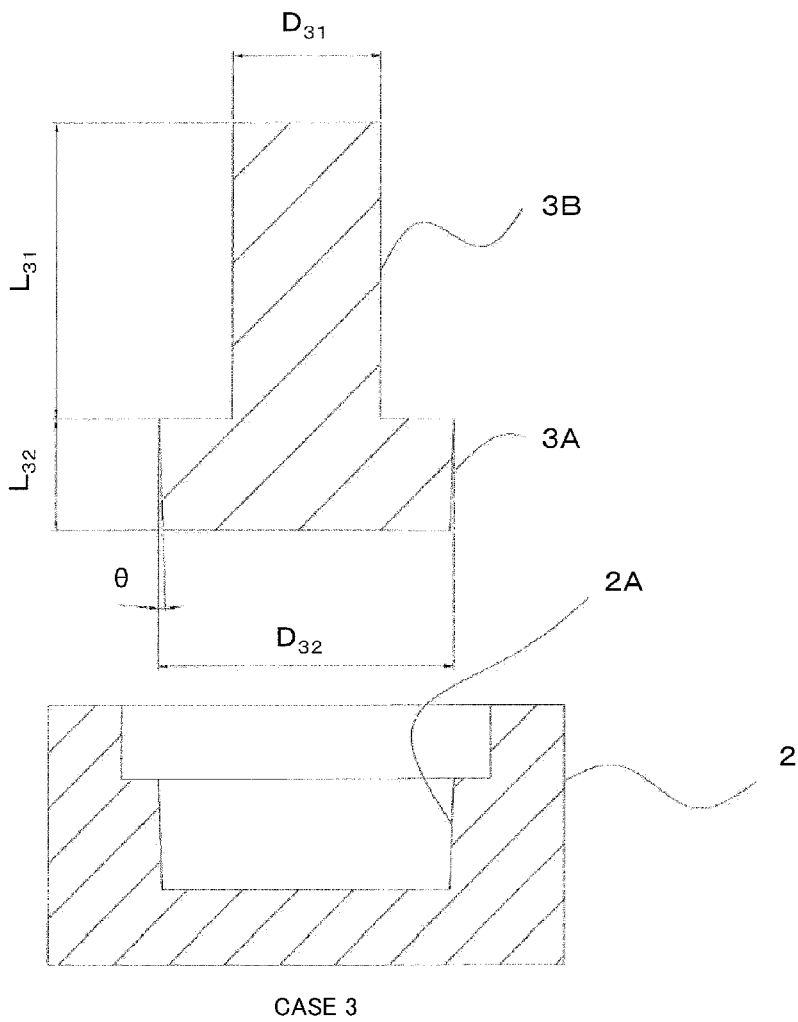
CASE 3

[Fig. 9]
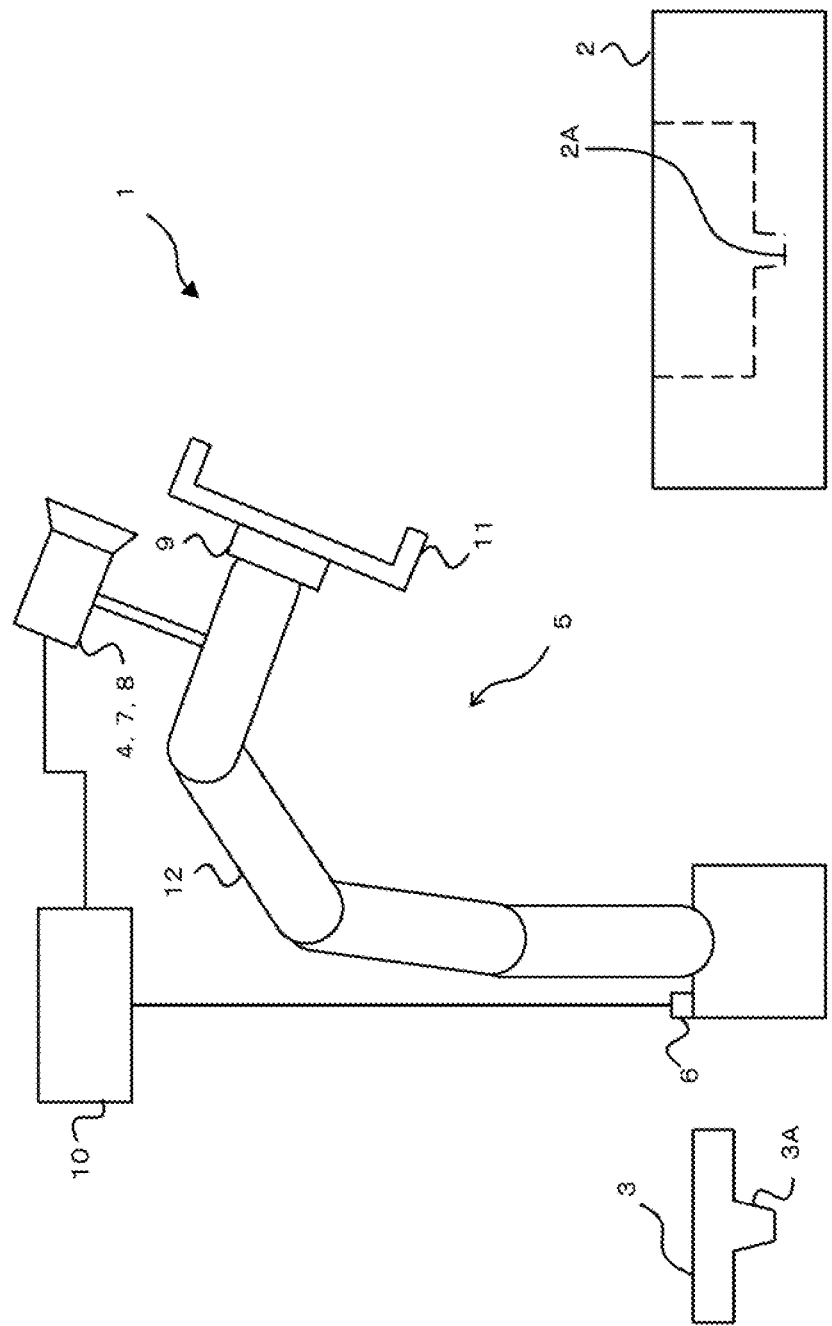

MAIN MOLD AND CORE JOINING DEVICE AND MAIN MOLD AND CORE JOINING METHOD

TECHNICAL FIELD

The present invention pertains to a main mold and core setting device and a main mold and core setting method.

BACKGROUND ART

Hitherto, in devices for setting a core in a main mold during casting, there is a known method wherein the inclination and the vertical position of the main mold and the core are detected using a combination of a CCD camera and an image processing device, and an industrial robot is caused to act on the basis of those data to set the core in the main mold (see, for example, Patent Document 1).

Further, in devices for setting a core in a main mold during casting, there is a known method wherein a force/torque sensor is attached to an arm of an industrial robot and is configured so as to be able to detect an external force applied to a tip of the robot ahead of the force/torque sensor, and the industrial robot is caused to act on the basis of those data to set the core in the main mold (see, for example, Patent Document 2).

CITATION LIST

Patent Literature

Patent Document 1: JP 3223033 A
Patent Document 2: JP H6-277799 A

SUMMARY OF INVENTION

Technical Problem

However, there is yet to be a method that enables core setting work, which has hitherto been implemented by a core setting operator using subtle manual sensation, to be completely reproduced by automation.

In light of the foregoing, the objective of the present invention is to provide a main mold and core setting device and a main mold and core setting method which enable the core setting work hitherto implemented by a core setting operator using subtle hand senses to be completely reproduced by automation.

Solution to Problem

In order to solve the abovementioned problem and achieve the objective, the main mold and core setting device of the present invention is provided with: a core grasping and moving means for grasping and moving a core; a core movement amount detection means for detecting a movement amount of the core grasping and moving means; a grasped core position and posture detection means for detecting a position, orientation, and inclination of the core grasped by the core grasping and moving means; a main mold position and posture detection means for detecting a position, orientation, and inclination of a main mold; a sensor for detecting a physical quantity applied to the core; and a control means for constantly calculating relationships between relative positions, orientations, and inclinations of the main mold and the core, and, from these relationships and a physical quantity applied to the core and detected by the sensor, controlling the core grasping and moving means so that the core is caused to be set with the main mold.

Further, in one embodiment of the present invention, the physical quantity applied to the core is an external force or torque.

Further, in one embodiment of the present invention, when the sensor detects an external force applied to the core in two axial directions orthogonal to the setting direction, torque applied in the rotational direction around the setting axis, and torque applied in the rotational direction around two axes orthogonal to the setting direction, the control means moves the core grasping and moving means so that these external forces and torque are eliminated and moves the core grasping and moving means in the direction of the main mold until the sensor detects that an external force applied to the core in the setting direction becomes a predetermined value.

Further, in one embodiment of the present invention, setting between the main mold and the core is carried out by setting a setting portion provided to the core with a setting portion provided to the main mold, the setting section provided to the main mold and the setting portion provided to the core both having a tapered shape.

Additionally, in one embodiment of the present invention, there is further provided a preliminary core position and posture detection means for detecting a position, orientation, and inclination of the core.

Further, in one embodiment of the present invention, the sensor is a six-axis force/torque sensor.

Further, in one embodiment of the present invention, the core grasping and moving means is an industrial robot.

Further, in one embodiment of the present invention, the preliminary core position and posture detection means is a vision sensor.

Further, in one embodiment of the present invention, the grasped core position and posture detection means and/or the main mold position and posture detection means is a vision sensor.

Further, in one embodiment of the present invention, the core movement amount detection means is an encoder.

Further, in one embodiment of the present invention, the control means is a robot controller.

Further, the main mold and core setting method of the present invention comprises: grasping and moving a core; detecting a position, orientation, and inclination of the grasped core; detecting a movement amount of the core; detecting a position, orientation, and inclination of a main mold; constantly calculating relationships between relative positions, orientations, and inclinations of the main mold and the core; detecting a physical quantity applied to the core; constantly calculating relationships between relative positions, orientations, and inclinations of the main mold and the core, and from these relationships and the physical quantity applied to the core, controlling movement of the core so that the core is caused to set with the main mold.

Further, in one embodiment of the present invention, the physical quantity applied to the core is an external force or torque.

Further, in one embodiment of the present invention, the abovementioned controlling comprises, upon detection of an external force applied to the core in two axial directions orthogonal to the setting direction, torque applied in the rotational direction around the setting axis, and torque applied in the rotational direction around two axes orthogonal to the setting direction, moving the core so that these external forces and torque are eliminated, and moving the core in the direction of the main mold until an external force applied to the core in the setting direction becomes a predetermined value.

Further, in one embodiment of the present invention, the method further comprises resetting, after the core is grasped, the physical quantity applied to the core.

Further, in one embodiment of the present invention, the method further comprises storing, after the core is grasped, the physical quantity applied to the core.

Advantageous Effects of Invention

According to the present invention, it is possible to completely reproduce, by automation, core setting work hitherto implemented by a core setting operator using subtle manual sensation, and therefore effects are exhibited wherein it is possible to make core setting work more efficient and to reduce defects in cast products caused by core setting work.

BRIEF DESCRIPTION OF DRAWINGS

FIG. 1 represents an overview of the entire structure of a main mold and core setting device according to the present embodiment.

FIG. 2 is a flow chart showing a main mold and core setting method using the setting device according to the present embodiment.

FIG. 3 is a flow chart showing a main mold and core setting method using the setting device according to the present embodiment.

FIG. 4 shows a positional relationship between a convex part of a core grasped by a core grasping portion and a concave part of a main mold in step S10.

FIG. 5 shows a positional relationship between the convex part of the core grasped by the core grasping portion and the concave part of the main mold in step S123.

FIG. 6 shows an example of a shape of the concave part provided to the main mold and a shape of the convex part provided to the core.

FIG. 7 shows an example of a shape of the concave part provided to the main mold and a shape of the convex part provided to the core.

FIG. 8 shows an example of a shape of the concave part provided to the main mold and a shape of the convex part provided to the core.

FIG. 9 represents an overview of the entire structure of a main mold and core setting device according to a modification.

DESCRIPTION OF EMBODIMENTS

Hereinafter, with reference to the attached drawings, there is a description, based on the drawings, of an embodiment for implementing a main mold and core setting device and a main mold and core setting method according to the present invention.

FIG. 1 represents an overview of the entire structure of a main mold and core setting device according to the present embodiment. A setting device 1 sets a core 3 with a main mold 2. Specifically, the setting device 1 sets a convex part 3A, which is a setting portion provided to the core 3, with a concave part 2A, which is a setting portion provided to the main mold 2. In addition, the concave part 2A and the convex part 3A both have a tapered shape. Further, a horizontal direction cross-sectional shape of a taper-shaped portion of the convex part 3A is circular.

The setting device 1 is provided with: a preliminary core position and posture detection means 4; a core grasping and moving means 5; a core movement amount detection means 6; a grasped core position and posture detection means 7; a main mold position and posture detection means 8; a sensor 9; and a control means 10.

The preliminary core position and posture detection means 4 detects a position, orientation, and inclination in three-dimensional space of the core 3 placed in a predetermined position. Here, "inclination" means the inclination of the core 3 with respect to a "reference surface", and "reference surface" means an installation surface on which the core grasping and moving means 5 is installed. The reason for not using a ground surface as the "reference surface" is because many casting factories are old facilities and do not always have floors which are precise flat surfaces. Thus, inaccuracies would occur as a result of using such a ground surface as a reference. The preliminary core position and posture detection means 4 is configured as a vision sensor.

The core grasping and moving means 5 grasps and moves the core 3. The core grasping and moving means 5 is provided with a core grasping portion 11 and a core moving portion 12. The core grasping portion 11 grasps the core 3. The core moving portion 12 moves the core grasping portion 11, which has grasped the core 3, to a position of the main mold 2. The core grasping and moving means 5 is an industrial robot, and more specifically, is configured as a vertical articulated robot. In addition, the core moving portion 12 corresponds to an arm of the vertical articulated robot, and the core grasping portion 11 corresponds to a robot hand attached to an end of an arm portion.

The core movement amount detection means 6 detects a movement amount (movement distance in three-dimensional space) of the core grasping and moving means 5. Specifically, the core movement amount detection means 6 constantly detects a drive amount of each drive shaft of the vertical articulated robot corresponding to the core moving portion 12. In addition, from these detection results, the control means 10, which is described later, constantly calculates the position, after movement, of the core grasping portion 11 that is grasping the core 3. In the present embodiment, the core movement amount detection means 6 is incorporated in the core grasping and moving means 5. The core movement amount detection means 6 is configured as an encoder.

The grasped core position and posture detection means 7 detects, after the core grasping and moving means 5 has moved close to the main mold, the position, orientation, and inclination in three-dimensional space of the core 3 grasped by core grasping and moving means 5. Here, "inclination" means the inclination of the core 3 with respect to a "reference surface", and "reference surface" means an installation surface on which the core grasping and moving means 5 is installed. The reason for not using a ground surface as the "reference surface" is because many casting factories are old facilities and do not always have floors which are precise flat surfaces. Thus, inaccuracies would occur as a result of using such a ground surface as a reference. Specifically, the grasped core position and posture detection means 7 detects the position, orientation, and inclination of the convex part 3A provided to the core 3. The grasped core position and posture detection means 7 is configured as a vision sensor.

The main mold position and posture detection means 8 detects the position, orientation, and inclination in three-dimensional space of the main body 2 placed in a predetermined position. Here, "inclination" means the inclination of the main body 2 with respect to a "reference surface", and "reference surface" means an installation surface on which the core grasping and moving means 5 is installed. The reason for not using a ground surface as the "reference surface" is because many casting factories are old facilities and do not always have floors which are precise flat surfaces. Thus, inaccuracies would occur as a result of using such a ground surface as a reference. Specifically, the main mold position and posture detection means 8 detects the position, orientation, and inclination of the concave part 2A provided to the main mold 2. The main mold position and posture detection means 8 is configured as a vision sensor.

When the core grasping and moving means 5 is grasping and moving the core 3, the sensor 9 detects external forces and torque which are physical quantities applied to the core 3. The sensor 9 is configured as a six-axis force/torque sensor. Accordingly, the sensor 9 is capable of detecting external forces and torque in three directions.

The control means 10 controls the core grasping and moving means 5. The control means 10, as one function thereof, constantly calculates relative positions, orientations, and inclinations of the main mold 2 and the core 3. Specifically, the control means 10 constantly calculates relative positions, orientations, and inclinations of the concave part 2A provided to the main mold 2 and the convex part 3A provided to the core 3.

More specifically, the control means 10 calculates relationships between relative positions, orientations, and inclinations of the main mold 2 (concave part 2A) and the core 3 (convex part 3A) on the basis of: information pertaining to the position, orientation, and inclination of the core 3 (convex part 3A) grasped by the core grasping and moving means 5 detected by the grasped core position and posture detection means 7; information pertaining to the movement amount of the core grasping and moving means 5 detected by the core movement amount detection means 6; and information pertaining to the position, orientation, and inclination of the main mold 2 (concave part 2A) detected by the main mold position and posture detection means 8. Thereafter, when the core grasping and moving means 5 moves, the control means 10 continues to calculate relationships between relative positions, orientations, and inclinations of the main mold 2 (concave part 2A) and the core 3 (convex part 3A) on the basis of information of the core movement amount detection means 6.

The control means 10, as an another function thereof, controls movement of the core grasping and moving means 5, from the calculated relationships between relative positions, orientations, and inclinations of the main mold 2 and the core 3, and external forces and torque applied to the core 3 and detected by the sensor 9, so that the core 3 is caused to set with the main mold 2. The control means 10 is configured as a robot controller, PLC, factory automation computer, or microcomputer, etc. capable of integrally and electronically processing information detected by the core movement amount detection means 6, information detected by the grasped core position and posture detection means 7, information detected by the main mold position and posture detection means 8, and information detected by the sensor 9.

(Main Mold and Core Setting Method)

Next, a main mold and core setting method using the setting device 1 according to the present embodiment shall be explained. FIG. 2 and FIG. 3 are flow charts showing a main mold and core setting method using the setting device 1 according to the present embodiment. FIG. 3 is a flow chart explaining the details of a main mold-core setting step (step S12).

First, the preliminary core position and posture detection means 4 (vision sensor) detects the position, orientation, and inclination of the core 3 placed in a predetermined position (step S1).

Next, the core moving portion 12 (arm of a vertical articulated robot) of the core grasping and moving means 5 moves close to the core 3 at high speed (step S2).

Next, the core grasping portion 11 (robot hand of a vertical articulated robot) of the core grasping and moving means 5 grasps the core 3 on the basis of the position, orientation, and inclination of the core 3 detected by the preliminary core position and posture detection means 4 (step S3). By doing the above, it is possible to realize grasping of the core 3 smoothly even in cases in which the core 3, before being grasped by the core grasping portion 11, is placed in a complex manner such as stacking.

Next, the core moving portion 12 stops after moving the core grasping portion 11, which is grasping the core 3, to a detection range of the grasped core position and posture detection means 7 (vision sensor) (step S4).

Next, the grasped core position and posture detection means 7 detects the position, orientation, and inclination of the core 3 grasped by the core grasping portion 11, and specifically, detects the position, orientation, and inclination of the convex part 3A provided to the core 3 (step S5).

Next, the main mold position and posture detection means 8 (vision sensor) detects the position, orientation, and inclination of the main mold 2 placed in a predetermined position, and specifically, detects the position, orientation, and inclination of the concave part 2A provided to the main mold 2 (step S6).

Next, the control means 10 (robot controller) calculates relative positions, orientations, and inclinations of the main mold 2 and the core 3, and specifically, calculates relative positions, orientations, and inclinations of the concave part 2A provided to the main mold 2 and the convex part 3A provided to the core 3, from: the position, orientation, and inclination of the core 3 grasped by the core grasping portion 11; the movement amount of the core grasping and moving means 5 detected by the core movement amount detection means 6 (encoder); and the position, orientation, and inclination of the main mold 2 (step S7).

Next, in a state in which the core grasping portion 11 is grasping the core 3, the control means 10 resets external forces and torque applied to the core 3 that were hitherto detected by the sensor 9 (force/torque sensor) (step S8).

Next, the core moving portion 12 moves the core 3, which is grasped by the core grasping portion 11, close to the main mold 2 at high speed (step S9). At this time, information on the relative positions, orientations, and inclinations of the main mold 2 (concave part 2A) and the core 3 (convex part 3A) is constantly updated by the control means 10 on the basis of information on the relative positions, orientations, and inclinations of the main mold 2 (concave part 2A) and the core 3 (convex part 3A) and information on the movement amount of the core moving portion 12 which were calculated in step S7.

Next, the core moving portion 12 moves the core 3, which is grasped by the core grasping portion 11, at low speed so that the convex part 3A, which is the setting portion of the core 3, approaches the concave part 2A, which is the setting portion of the main mold 2 (step S10). At this time, information on the relative positions, orientations, and inclinations of the concave part 2A and the convex part 3A is constantly updated by the control means 10 on the basis of information on the relative positions, orientations, and inclinations of the concave part 2A and the convex part 3A and information on the movement amount of the core moving portion 12 which were calculated in step S7.

FIG. 4 shows a positional relationship between the convex part 3A of the core 3A, which is grasped by the core grasping portion 11, and the concave part 2A of the main mold 2 in step S10. In the diagram, Z represents the axial direction in which the core 3 and the main mold 2 (convex part 3A of the core 3 and concave part 2A of the main mold 2) set, and X and Y represent directions which are orthogonal to the setting axis Z.

Next, the control means 10 confirms whether the sensor 9 has detected an external force Fz in the setting axis direction Z, an external force Fx in the X axis direction orthogonal to the axis Z, and/or an external force Fy in the Y axis direction orthogonal to the axis Z (step S11). If detection of an external force Fz, an external force Fx and/or an external force Fy by the sensor 9 is not confirmed (step S11: No), the control means 10 continues to cause the core moving portion 12 to move the core 3, which is grasped by the core grasping portion 11, at low speed so that the convex part 3A, which is the setting portion of the core 3, approaches the concave part 2A, which is the setting portion of the main mold 2.

Meanwhile, if detection of an external force Fz, an external force Fx, and/or an external force Fy by the sensor 9 is confirmed (step S11: Yes), the control means 10 stops moving the core moving portion 12. Thereafter, the method proceeds to a main mold-core setting step (step S12). It should be noted that in step S11, it is possible to detect an external force Fz, an external force Fx, and an external force Fy because the sensor 9 is configured as a six-axis force/torque sensor. This is an advantage that cannot be obtained by using a load cell.

(Main Mold-Core Setting Step)

In the main mold-core setting step (step S12), first, the control means 10 determines whether the convex part 3A of the core 3 is in the process of being set with the concave part 2A of the main mold 2 (step S121). Specifically, the control means 10 makes a determination from a relationship between a calculated height of an end portion of the convex part 3A (distance from the reference surface in the setting axis direction Z) and a calculated height of the upper surface peripheral edge of the concave part 2A of the main mold 2 (distance from the reference surface in the setting axis direction Z).

If it is determined that the convex part 3A of the core 3 is not in the process of being set with the concave part 2A of the main mold 2 (step S121: No), the control means 10 determines that an abnormality has occurred and emergency stops the setting device 1. This happens in cases when, due to contact other than that between the convex part 3A of the core 3 and the concave part 2A of the main mold 2 having occurred, such as the end portion of the convex part 3A of the core 3 coming into contact with the upper surface peripheral edge of the concave part 2A of the main mold 2, etc., the control means 10 determines that the sensor 9 has detected an external force Fz, an external force Fx, and/or an external force Fy.

Meanwhile, if the control means 10 determines that the convex part 3A of the core 3 is in the process of being set with the concave part 2A of the main mold 2 (step S121: Yes), the control means 10 confirms whether the sensor has detected an external force Fx in the X axis direction, an external force Fy in the Y axis direction, torque Mz applied in the rotational direction around the Z axis, torque Mx applied in the rotational direction around the X axis, and/or torque My applied in the rotational direction around the Y axis (step S122).

When the sensor 9 detects an external force Fx, an external force Fy, torque Mz, torque Mx, and/or torque My (step S122: Yes), the control means 10 moves the core moving portion 12 (convex part 3A of the core 3) at low speed in the XY plane in the direction in which the external force Fx, the external force Fy, the torque Mz, the torque Mx, and/or the torque My detected by the sensor 9 decrease (step S123). In other words, the control means 10 moves the convex part 3A of the core 3 so that the positions of the concave part 2A of the main mold 2 and the convex part 3A of the core 3 align with one another and achieve a position for setting having the least resistance.

FIG. 5 shows a positional relationship between the convex part 3A of the core 3, which is grasped by the core grasping portion 11, and the concave part 2A of the main mold 2 in step S123. In this diagram, the sensor 9 detects torque My and the control means 10 moves the core moving portion 12 (convex part 3A of the core 3) in the XY plane in the direction in which the torque My decreases.

Thereafter, step S122 and step S123 are repeated until the external force Fx, the external force Fy, the torque Mz, the torque Mx, and/or the torque My which are detected by the sensor become zero.

Meanwhile, when the sensor 9 does not detect an external force Fx, an external force Fy, torque Mz, torque Mx, and/or torque My (step S122: No), that is, when the external force Fx, the external force Fy, the moment Mz, the torque Mx, and/or the torque My become zero, the control means 10 moves the core moving portion 12 at low speed in the axis Z direction. In other words, the control means 10 moves the convex part 3A of the core 3 at low speed to the concave part 2A of the main mold 2 (step S124). Due thereto, setting of the convex part 3A of the core 3 and the concave part 2A of the main mold 2 commences.

Next, the control means 10 determines whether the external force Fz in the setting axis direction Z detected by the sensor 9 has reached a setting completion external force Fza which was prescribed beforehand (step S125). When the control means 10 determines that the external force Fz in the setting axis direction Z detected by the sensor 9 has reached the setting completion external force Fza (step S125: Yes), setting of the main mold 2 (concave part 2A) and the core 3 (convex part 3A) is determined to have ended and movement of the core moving portion 12 is stopped (step S126). The setting completion external force Fza varies depending on the constituent material, the compressive strength, the size, and/or the shape of the main mold 2 and the core 3, but is preferably set so that a pressurization force is 0.005-4.0 MPa when the projected area of the concave part 2A of the main mold 2 and/or the convex part 3A of the core 3, as viewed from the setting axis Z direction, is defined as being the pressure receiving area. When the pressurization force is less than 0.005 MPa, setting cannot be performed due to friction generated between setting portions of the concave part 2A of the main mold 2 and the convex part 3A of the core 3. Conversely, when the pressurization force exceeds 4.0 MPa, there is a risk of the setting portions of the concave part 2A of the main mold 2 and the convex part 3A of the core 3 breaking.

Meanwhile, when the control means 10 determines that the external force Fz in the setting axis direction Z detected by the sensor 9 has not reached the setting completion external force Fza (step S125: No), the process returns to step S122.

Next, the core moving portion 11 of the core grasping and moving means 5 releases the grasp on the core 3 (step S127). Due thereto, setting of the core in the main mold ends.

Next, the core moving portion 12 of the core grasping and moving means 5 moves at high speed to the initial position (step S128). Due thereto, the main mold-core setting step (step S12) ends.

When the main mold-core setting step (step S12) ends, the main mold and core setting work ends. Next, if a main mold 2 and core 3 which are to be set have been placed in a predetermined position, main mold and core setting work continues to be performed.

In the setting method according to the present embodiment, it is possible to change the order of the steps. For example, the order of step S7 and step S8 may be reversed, etc., and the order of all steps may be changed as long as it is possible to set and set the core 3 inside the main mold 2.

Further, in the setting method according to the present embodiment, it is also possible to eliminate some of the steps. For example, if the core 3, before being grasped by the core grasping portion 11 of the core grasping and moving means 5, is set in a positional posture determined beforehand, step S1 may be omitted. Thus, it is possible to omit a step during the process as long as it is possible to fulfill the objective of setting and setting the core 3 inside the main mold 2.

Further, in step S8, it is possible to change work for resetting an external force or torque applied to the core 3 detected by the sensor 9. For example, it is possible to configure so that the control means 10 stores an external force or torque detected by the sensor 9 and by using that as a reference value, etc., discriminates a difference between an external force or torque at the initial state and an external force or torque in step S11, S122, S123, or S125.

Furthermore, it is possible to change the moving speed of the core moving portion 12 of the core grasping and moving means 5. For example, the moving speed of the core moving portion 12 of the core grasping and moving means 5 may be set to a low speed in steps S2, S9, and S128, etc., and as long as it is possible to fulfill the objective of setting and setting the core 3 inside the main mold 2, the core moving portion 12 may be moved at any speed.

(Examples of Sizes of Core and Main Mold)

Next, three examples of combinations of sizes of the convex part 3A of the core 3 and the concave part 2A of the main mold 2 are described. FIGS. 6 to 8 each show an example of a shape of the concave part 2A provided to the main mold 2 and a shape of the convex part 3A provided to the core 3. Combinations of the convex part 3A of the core 3 and the concave part 2A of the main mold 2 that may be applied in the present invention are not limited to these cases. FIG. 6 shows Case 1 in which $D_{11}=40$ mm, $L_{11}=30$ mm, $D_{12}=40$ mm, $L_{12}=25$ mm, and $\theta=2°$. FIG. 7 shows Case 2 in which $D_{21}=15$ mm, $L_{21}=40$ mm, $D_{22}=35$ mm, $L_{22}=20$ mm, and $\theta=2°$. FIG. 8 shows Case 3 in which $D_{31}=40$ mm, $L_{31}=80$ mm, $D_{32}=80$ mm, $L_{32}=30$ mm, and $\theta=2°$. The reference sign 3B in each diagram represents a remaining portion of the convex part 3A of the core 3 that is not a portion (taper-shaped portion) that is actually set in the concave part 2A provided to the main mold 2.

Generally, in combinations of the convex part 3A of the core 3 and the concave part 2A of the main mold 2 that are to be set with one other in the longitudinal direction, the taper angle of the setting portions is often approximately 2°. This is elicited as an empirical value and is also disclosed in technical books pertaining to casting. Using the present invention, setting was carried out with the combinations of the convex part 3A of the core 3 and the concave part 2A of the main mold 2 described in Cases 1 to 3, and in all cases the clearance between the concave part 2A of the main mold 2 and the convex part 3A of the core 3 could be set to be 0.3 mm or less.

As mentioned above, there is yet to be a device for setting a core in a main mold that enables core setting work, which has hitherto been implemented by a core setting operator using subtle manual sensation, to be completely reproduced by automation. Generally, setting and joining portions of a main mold and a core are molded in tapered shapes that set with one another. However, in order to produce better quality cast products, when setting the core into this taper-shaped setting and joining portion, work such as pressing the core into the setting portion using subtle manual sensation so that the core does not break at the end of the setting is performed as work that is carried out when a core setting operator sets the core in the main mold.

In contrast thereto, with the setting device 1 according to the present embodiment, it is possible to reproduce, by automation using a robot, good quality casting-making that has hitherto been realized through the experience and intuition of a core setting operator. Furthermore, it is possible to narrow, to an extremely low limit of 0.3 mm or less, the clearance between the concave part 2A of the main mold 2 and the convex part 3A of the core 3, which hitherto could only be realized by relying on human hands.

In addition, by being able to set the clearance between the setting portions of the concave part 2A of the main mold 2 and the convex part 3A of the core 3 to be 0.3 mm or less, it is possible to increase adhesiveness between the main mold 2 and the core 3 and several effects can be obtained. As a first example, by improving relative positional precision between the main mold and the core, it is possible to improve the precision of cast products. As a second example, by eliminating a gap between the main mold and the core, it is possible to reduce burrs on cast products. As a third example, it is possible to improve adhesiveness between the main mold and the core by using a slurry-type mold paste applied to the setting portions. As a fourth example, by making the slurry-type mold paste applied to the setting portions thinner, it is possible to improve the precision of cast products. Furthermore, it is possible to reduce defects (for example, mold shift, level difference, uneven thickness, dropping from mold, etc.) caused by core setting.

(Modifications)

The arrangement of any of the preliminary core position and posture detection means 4 (vision sensor), the grasped core position and posture detection means 7 (vision sensor), and the main core position and posture detection means 8 (vision sensor) may be changed. FIG. 9 represents an overview of the entire structure of a main mold and core setting device according to a modification. In the main mold and core setting device in FIG. 1, each of the preliminary core position and posture detection means 4 (vision sensor), the grasped core position and posture detection means 7 (vision sensor), and the main mold position and posture detection means 8 (vision sensor) is fixed, but as in FIG. 9, the functions of the preliminary core position and posture detection means 4 (vision sensor), the grasped core position and posture detection means 7 (vision sensor), and the main mold position and posture detection means 8 (vision sensor) may be integrated in one vision sensor and configured to move by being attached to the core grasping and moving means 5 (arm of a vertical articulated robot).

Thus, as long as the means is able to detect the position, orientation, and inclination of the core 3 placed in a predetermined position, the position, orientation, and inclination of the core 2 placed in a predetermined position, and the position, orientation, and inclination of the core 3 grasped by the core grasping portion 11, any means may be used in this arrangement.

Further, in the present embodiment, the concave part 2A, which is a setting portion provided to the main mold 2, and the convex part 3A, which is a setting portion provided to the core 3, are set but a convex part may be provided to the main mold 2 and a concave part may be provided to the core 3. In that case, the main mold 2 and the core 3 are set by setting the convex part, which is a setting portion provided to the main mold 2, and the concave part, which is a setting portion provided to the core 3.

Further, in the present embodiment, the core grasping and moving means 5 is configured as a vertical articulated robot, but it is possible to use another means. Any means may be used as long as it is a means that can be driven and conveyed freely in three-dimensional space, such as a horizontal articulated robot, a parallel link robot, a collaborative robot, and a drive actuator capable of linear drive on each of three X, Y, and Z axes. Further, power is also not limited to electrical power and may be hydraulic or pneumatic.

Further, in the present embodiment, the core grasping portion 11 of the core grasping and moving means 5 is configured as a robot hand, but it is possible to use another means. Any means may be used as long as it is a means that can handle a core, such as a hand that is inserted into a concave part or a portion having a hole therein provided to the core 3 and opens outwardly, a hand having a shape for scooping the core, and a hand having a shape for piercing the core.

Further, in the present embodiment, the preliminary core position and posture detection means 4, the grasped core position and posture detection means 7, and the main core position and posture detection means 8 are configured as vision sensors but it is possible to use another means. Any means may be used as long as it is a means that can confirm a distance and a position, such as a laser sensor, a linear encoder, a proximity sensor, an infrared sensor, a millimeter wave sensor, and a microwave sensor.

Further, in the present embodiment, the sensor 9 is configured as a six-axis force/torque sensor, but it is possible to use another means. Any means may be used as long as it is a means that enables detection of an external force Fz in the setting axis Z direction, torque Mz around the Z axis, external forces Fx, Fy in the X, Y axis directions orthogonal to the Z axis, and torque Mx and My around the X and Y axes orthogonal to the Z axis, such as an acceleration sensor or a load detector comprising a plurality of strain gauges.

Further, in the present embodiment, the core movement amount detection means 6 is configured as an encoder, but it is possible to use another means. Any means may be used as long as it is a means that can confirm a distance and moving direction of the core 3 grasped by the core grasping portion 11 of the core grasping and moving means 5, such as a laser sensor, a linear encoder, a proximity sensor, an infrared sensor, a millimeter wave sensor, and a microwave sensor.

Various embodiments of the present invention are explained above, but the above explanations do not limit the present invention and various modifications may be considered, including deletion, addition, and replacement of constituent elements within the technical scope of the present invention.

REFERENCE SIGNS LIST

1 Setting device
2 Main mold
2A Concave part
3 Core
3A Convex part
4 Preliminary core position and posture detection means
5 Core grasping and moving means
6 Core movement amount detection means
7 Grasped core position and posture detection means
8 Main mold position and posture detection means
9 Sensor
10 Control means
11 Core grasping portion
12 Core moving portion
X, Y Axis
Z Setting axis
Fx, Fy, Fz External force
Mx, My Torque
Fza Setting completion external force

The invention claimed is:

1. A main mold and core setting device comprising:
a core grasping and moving means for grasping and moving a core;
a core movement amount detection means for detecting a movement amount of the core grasping and moving means;
a grasped core position and posture detection means for detecting a position, orientation, and inclination of the core grasped by the core grasping and moving means;
a main mold position and posture detection means for detecting a position, orientation, and inclination of a main mold;
a sensor for detecting a physical quantity applied to the core; and
a control means for constantly calculating relationships between relative positions, orientations, and inclinations of the main mold and the core and, from these relationships and the physical quantity applied to the core detected by the sensor, controlling the core grasping and moving means so that the core is caused to set with the main mold.

2. The main mold and core setting device according to claim 1, wherein the physical quantity applied to the core is an external force or torque.

3. The main mold and core setting device according to claim 2, wherein the control means:
moves the core grasping and moving means when the sensor detects external forces applied to the core in two axial directions orthogonal to the setting direction, torque applied in the rotational direction around the setting axis, and torque applied in the rotational direction around two axes orthogonal to the setting direction, so that these external forces and torque are eliminated; and
moves the core grasping and moving means in the direction of the main mold until the sensor detects that an external force applied to the core in the setting direction becomes a predetermined value.

4. The main mold and core setting device according to claim 1, wherein setting between the main mold and the core is carried out by setting a setting portion provided to the core with a setting portion provided to the main mold, the setting section provided to the main mold and the setting portion provided to the core both having a tapered shape.

5. The main mold and core setting device according to claim 1, further comprising a preliminary core position and posture detection means for detecting a position, orientation, and inclination of the core.

6. The main mold and core setting device according to claim 1, wherein the sensor is a six-axis force/torque sensor.

7. The main mold and core setting device according to claim 1, wherein the core grasping and moving means is an industrial robot.

8. The main mold and core setting device according to claim 5, wherein the preliminary core position and posture detection means is a vision sensor.

9. The main mold and core setting device according to claim 1, wherein the grasped core position and posture detection means and/or the main mold position and posture detection means is a vision sensor.

10. The main mold and core setting device according to claim 1, wherein the core movement amount detection means is an encoder.

11. The main mold and core setting device according to claim 1, wherein the control means is a robot controller.

12. A main mold and core setting method comprising:
grasping and moving a core;
detecting a position, orientation, and inclination of the grasped core;
detecting a movement amount of the core;
detecting a position, orientation, and inclination of a main mold;
constantly calculating relationships between relative positions, orientations, and inclinations of the main mold and the core;
detecting a physical quantity applied to the core; and
constantly calculating relationships between relative positions, orientations, and inclinations of the main mold and the core, and from these relationships and the physical quantity applied to the core, controlling movement of the core so that the core is caused to set with the main mold.

13. The main mold and core setting method according to claim 12, wherein the physical quantity applied to the core is an external force or torque.

14. The main mold and core setting method according to claim 13, wherein the controlling comprises:
moving the core when external forces applied to the core in two axial directions orthogonal to the setting direction, torque applied in the rotational direction around the setting axis, and torque applied in the rotational direction around two axes orthogonal to the setting direction are detected, so that these external forces and torque are eliminated; and
moving the core in the direction of the main mold until an external force applied to the core in the setting direction becomes a predetermined value.

15. The main mold and core setting method according to claim 12, further comprising resetting, after the core is grasped, the physical quantity applied to the core.

16. The main mold and core setting method according to claim 12, further comprising storing, after the core is grasped, the physical quantity applied to the core.

* * * * *